(12) United States Patent
Hu et al.

(10) Patent No.: US 6,577,077 B2
(45) Date of Patent: Jun. 10, 2003

(54) CIRCUIT ARRANGEMENT

(75) Inventors: Feng-Kang Hu, Palos Verdes Estates, CA (US); Zhenggang Yang, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 10/011,987

(22) Filed: Dec. 4, 2001

(65) Prior Publication Data

US 2002/0097005 A1 Jul. 25, 2002

(30) Foreign Application Priority Data

Dec. 4, 2000 (EP) .............................. 00204301

(51) Int. Cl.⁷ ............................................. G05F 1/00
(52) U.S. Cl. ...................... 315/291; 315/219; 315/247; 315/224
(58) Field of Search ................. 315/172, 173, 315/209 R, 219, 247, 224, 223, 291, 307, DIG. 5

(56) References Cited

U.S. PATENT DOCUMENTS

| | | | | |
|---|---|---|---|---|
| 5,041,766 A | * | 8/1991 | Fiene et al. ................. | 315/219 |
| 5,068,573 A | | 11/1991 | Bruning et al. ......... | 315/209 R |
| 5,115,347 A | * | 5/1992 | Nilssen ....................... | 315/247 |
| 5,374,874 A | * | 12/1994 | Nilssen ....................... | 315/219 |
| 5,387,847 A | | 2/1995 | Wood ..................... | 315/209 R |
| 6,337,800 B1 | * | 1/2002 | Chang ..................... | 315/209 R |

FOREIGN PATENT DOCUMENTS

WO    WO 9009087    9/1990    ......... H05B/41/29

* cited by examiner

*Primary Examiner*—Don Wong
*Assistant Examiner*—Jimmy T. Vu

(57) ABSTRACT

In an electronic ballast for operating a discharge lamp at a high frequency, a single feedback and a double pump feedback are implemented in a combined way. The resulting electronic ballast combines the advantageous of a simple topology with favorable properties with respect to power factor, THD, efficacy, crest factor of the lamp current and EMI restrain.

6 Claims, 2 Drawing Sheets

CIRCUIT ARRANGEMENT

BACKGROUND OF THE INVENTION

The invention relates to a circuit arrangement for operating a lamp, comprising supply input terminals for connection to a supply voltage source, a rectifier coupled to the supply input terminals for rectifying an AC supply voltage supplied by the supply voltage source, an inverter equipped with input terminals coupled to respective output terminals of the rectifier for generating a high frequency lamp current out of a DC voltage, a first unidirectional element D1 coupled between a first output terminal of the rectifier and an input terminal of the inverter, a first branch that is coupled between a terminal N1 between the first output terminal of the rectifier and the first unidirectional element and a terminal N2 in the inverter on which during operation of the circuit arrangement a high frequency voltage is present.

The invention also relates to a compact lamp equipped with such a circuit arrangement.

A circuit arrangement as mentioned in the opening paragraph is known. The known circuit arrangement incorporates power feedback realized by the first unidirectional element and the first branch. Because of this power feedback the power factor of the known circuit arrangement is relatively high although the topology of the known circuit is relatively simple and therefore relatively cheap. Disadvantages of the known circuit arrangement are a relatively low efficacy and the fact that it is very difficult to restrain the EMI.

SUMMARY OF THE INVENTION

The invention aims to provide a circuit arrangement for operating a lamp that is relatively cheap and simple, has a good power factor combined with a relatively high efficacy and offers a good EMI restrain.

A circuit arrangement as mentioned in the opening paragraph is therefore according to the invention characterized in that the circuit arrangement is further provided with a second branch comprising a series arrangement of a second (D2), a third (D3), a fourth (D4) and a fifth unidirectional element (D5) that connects the input terminals of the inverter, a third branch comprising a first capacitive element C1 and connecting a cathode of the second unidirectional element with an anode of the fourth unidirectional element, a fourth branch comprising a second capacitive element C2 connecting an anode of the fifth unidirectional element with a cathode of the third unidirectional element, a fifth branch connecting a terminal N5 between the third and the fourth unidirectional element with the terminal N2.

It was found that a circuit arrangement according to the invention has a good power factor. In addition it was found that the efficacy of a circuit arrangement according to the invention is relatively high and that the EMI could easily be restrained.

It is advantageous to equip a circuit arrangement according to the invention with a sixth branch comprising a third capacitive element (C3) and coupling a cathode of the first unidirectional element to terminal N5. This third capacitive element controls the amplitude of the voltage present at the terminal N5 and can be so dimensioned that a further improvement in the shape of the current supplied by the supply voltage source is realized.

Good results were obtained for a circuit arrangement according to the invention, in which the inverter comprises a bridge circuit that is equipped with a seventh branch comprising a series arrangement of two switching elements and in which the terminal N2 is a terminal of the seventh branch between the two switching elements.

Good results have also been obtained for embodiments of a circuit arrangement according to the invention, in which the first branch comprises capacitive means.

Since a circuit arrangement according to the invention has a relatively simple topology, it can be manufactured so that it is very small. For this reason a circuit arrangement according to the invention is very suitable to be used in the ballast means of a compact lamp comprising a light source provided with a vessel that is closed in a gastight manner and transmissive for visible radiation, a housing connected to the light source and provided with a lamp cap, ballast means electrically connected to the light source for operating the light source and positioned at least partly in a space surrounded by the housing.

BRIEF DESCRIPTION OF THE DRAWINGS

An embodiment of the invention will be further explained making use of a drawing.

In the drawing

DETAILED DESCRIPTION OF THE INVENTION

Figure 1:
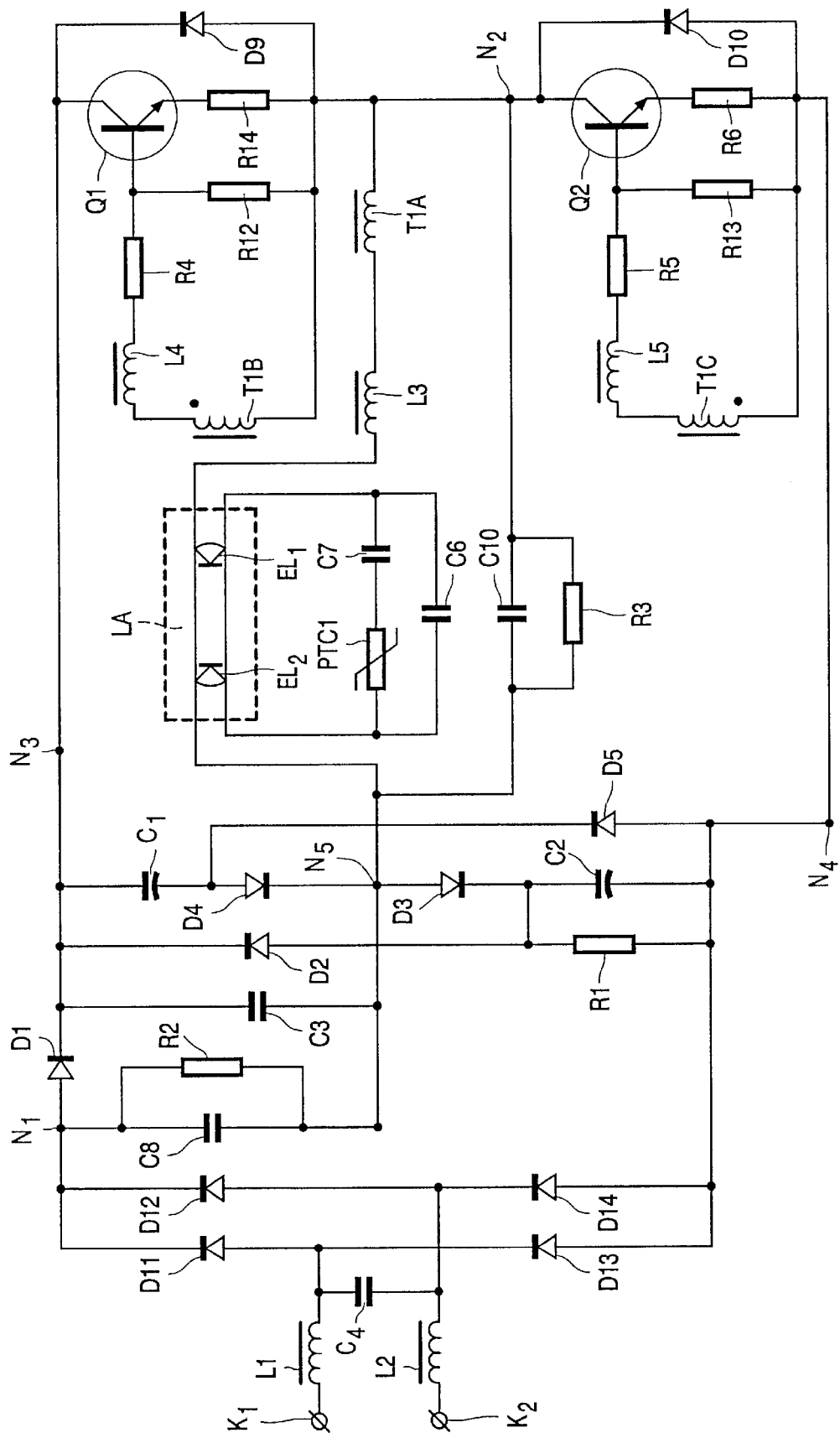
FIG. 1 shows a schematic representation of an embodiment of a circuit arrangement according to the invention with a lamp LA connected to it.

In FIG. 1 K1 and K2 are supply input terminals for connection to a supply voltage source. Supply input terminal K1 is connected by means of inductive element L1 to a first input terminal of a rectifier for rectifying an AC supply voltage supplied by the supply voltage source. Supply input terminal K2 is connected to a second input terminal of the rectifier by means of inductive element L2. The first input terminal and the second input terminal of the rectifier are connected by means of a capacitor C4. Inductive elements L1 and L2 together with capacitor C4 together form an input filter. The rectifier is formed by the diodes D11–D14. A first output terminal of the rectifier is connected to a second output terminal by means of a series arrangement of diode D1, capacitor C1, diode D4, diode D3 and capacitor C3. Capacitor C1 and diodes D4 and D3 are shunted by diode D2. Diodes D4 and D3 and capacitor C2 is shunted by diode D5. Capacitor C3 connects a cathode of diode D1 to a common terminal of diodes D3 and D4. Capacitor C8 connects a terminal N1 between the first output terminal of the rectifier to a common terminal N5 of diodes D3 and D4. Capacitor C8 is shunted by resistor R2. The cathode of diode D1 is connected to the second output terminal of the rectifier by means of a series arrangement of terminal N3, first switching element Q1, resistor R14, terminal N2, switching element Q2, resistor R5 and terminal N4. First switching element Q1 is shunted by diode D9 second switching element Q2 is shunted by diode D10. Terminal N2 is connected to terminal N5 by means of a series arrangement primary winding T1A, inductive element L3 and lamp LA. The lamp LA is shunted by a capacitor C6. Capacitor C6 is shunted by a series arrangement of PTC resistor PTC1 and capacitor C7. Terminal N2 is also connected to terminal N5 by means of capacitor C10. Capacitor C10 is shunted by resistor R3. A control electrode of switching element Q1 is connected to terminal N2 by means of resistor R12. Resistor R12 is shunted by a series arrangement of resistor R4, inductive element L4 and secondary winding T1B. A control electrode of switching element Q2 is connected to terminal N4 by means of resistor R13. Resistor R13 is shunted by a series arrangement of resistor R5, inductive element L5 and secondary winding T1C. Primary winding T1A and secondary windings T1B and T1C together form a control transformer T1 for during operation generating control signals for rendering switching element Q1 and switching element Q2 alternately conducting and non-conducting. In this embodiment diodes D1–D5 form a first to fifth unidirectional element respectively. Diodes D2–D5 together form a second branch connecting the input terminals of the inverter. Capacitor C1 forms a third branch connecting a cathode of D2 with an anode of D4. Capacitor C2 forms a fourth branch connecting an anode of D5 with a cathode of D3. Capacitors C8 and C10 together with resistors R2 and R3 together form a first branch connecting terminal N1 and terminal N2. Terminals N3 and N4 form input terminals of an inverter that is formed by terminals N3 and N4, switching elements Q1 and Q2, diodes D9 and D10, the control transformer T1, resistors R3, R4, R5, R12, R13, R14 and R6, inductive elements L4, L5 and L3, capacitors C6, C7 and C10 and PTC1. Primary winding T1A, inductive element L3, capacitors C6, C7 and C10, resistor R3, PTC1 and the lamp LA in this embodiment form a fifth branch connecting terminals N5 and terminal N2. C3 forms a sixth branch coupling a cathode of diode D1 to a common terminal N5 of diodes D3 and D4. The series arrangement of switching element Q1, resistor R14, terminal N2, switching element Q2 and resistor R6 forms a bridge circuit and a seventh branch that comprises a series arrangement of two switching elements.

The operation of the circuit arrangement shown in FIG. 1 is as follows.

When the input terminals are connected to a supply voltage source that supplies an AC supply voltage, the AC supply voltage is rectified by the rectifier and a DC voltage is present between the input terminals N3 and N4 of the inverter. By means of a circuit part well known in the art but not shown in FIG. 1, the inverter starts oscillating. Once oscillating the control transformer renders the switching elements Q1 and Q2 alternately conducting and non-conducting at a frequency f. As a result an AC current with frequency f flows through the branch formed by primary winding T1A, inductive element L3, capacitors C6 and C7, PTC1. Immediately after the inverter has started oscillating the temperature of PTC1 is low and therefore its impedance is also low. For this reason the AC current flows through the electrodes E11 and E12 of the lamp and preheats these electrodes. The current flowing through PTC1 warms up PTC1 thereby increasing its impedance. This increase in impedance causes the effective value of the capacity formed by PTC1 and capacitors C6 and C7 to change and as a result the value of the frequency f at which the inverter oscillates changes as well. This frequency shift causes the lamp to ignite and the inverter from then on oscillates at a substantially constant frequency $f_{stat}$. During operation a high frequency voltage with frequency f is present a terminal N5. This high frequency voltage causes diodes D2–D5 and capacitors C1, C2 and C3 to function as a double pump feedback and also causes diode D1 and capacitor C8 to function as a single feedback. The double pump feedback and the single feedback both improve the power factor of the circuit arrangement considerably by making sure that high frequency current pulses are drawn from the supply voltage source at substantially any time during a period of the AC supply voltage. It was found that the circuit arrangement combined favorable properties with respect to power factor, THD, crest factor of the lamp current, efficacy, EMI restrain with a simple topology. For a practical circuit that had the topology as shown in FIG. 1, it was found that the power factor was 0.99, the THD was 13%, while the crest factor of the lamp current was 1.7. Additionally it was found that the efficacy of the practical circuit was very high and that the filter formed by inductive elements L1 and L2 and capacitor C4 can be of relatively small dimensions and at the same time limit the EMI to acceptable proportions.

Figure 2:
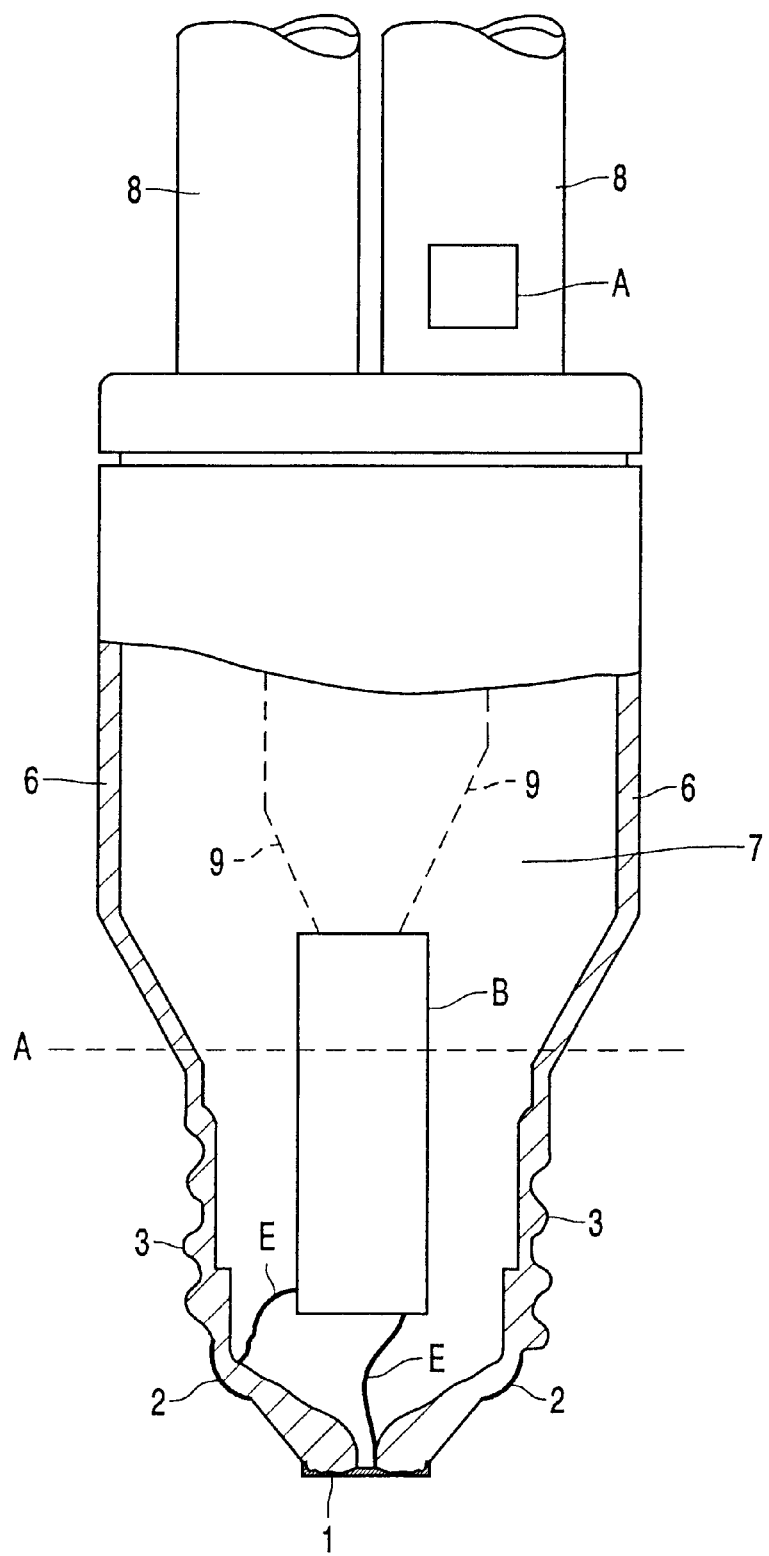
FIG. 2 shows a compact lamp equipped with a circuit arrangement as shown in FIG. 1.

In FIG. 2, a light source 8 is provided with a discharge vessel which is closed in a gastight manner, is transmissive for visible radiation and is equipped with two electrodes (not shown). The light source contains a noble gas or a mixture of noble gases together with mercury. A housing 6 is connected to the light source and equipped with a lamp cap 3. In this embodiment the part of the housing that is below the broken line A. The housing may for instance be formed out of a synthetic resin. Circuit arrangement B is a circuit arrangement for operating the light source. The topology of circuit arrangement B is as presented in FIG. 1. Circuit arrangement B is electrically connected to electrodes in the light source. This connection is indicated by means of the broken lines 9. The circuit arrangement B is placed in a space 7 which is surrounded by the housing 6. E are conducting connectors between the circuit arrangement B and metal contacts 1 and 2 placed on the lamp cap. During operation the supply voltage is present between contacts 1 and 2.

What is claimed is:

1. A circuit arrangement for operating a lamp, comprising supply input terminals for connection to a supply voltage source, a rectifier coupled to the supply input terminals for rectifying an AC supply voltage supplied by the supply voltage source, an inverter equipped with input terminals coupled to respective output terminals of the rectifier for generating a high frequency lamp current out of a DC voltage, a first unidirectional element (D1) coupled between a first output terminal of the rectifier and an input terminal of the inverter, a first branch that is coupled between a terminal (N1) between the first output terminal of the rectifier and the first unidirectional element and a terminal (N2) in the inverter on which during operation of the circuit arrangement a high frequency voltage is present, characterized in that the circuit arrangement is further provided with a second branch comprising a series arrangement of a second (D2), a third (D3), a fourth (D4) and a fifth unidirectional element (D5) that connects the input terminals of the inverter, a third branch comprising a first capacitive element (C1) and connecting a cathode of the second unidirectional element with an anode of the fourth unidirectional element, a fourth branch comprising a second capacitive element (C2) connecting an anode of the fifth unidirectional element with a cathode of the third unidirectional element, a fifth branch connecting a terminal (N5) between the third and the fourth unidirectional element with the terminal (N2) of the inverter.

2. The circuit arrangement according to claim 1, equipped with a sixth branch comprising a third capacitive element (C3) and coupling a cathode of the first unidirectional element to terminal (N5).

3. The circuit arrangement according to claim 1, in which the inverter comprises a bridge circuit that is equipped with a seventh branch comprising a series arrangement of two switching elements.

4. The circuit arrangement according to claim 3, in which the terminal (N2) is a terminal of the seventh branch between the two switching elements.

5. The circuit arrangement according to claim 1, in which the first branch comprises capacitive means.

6. Compact lamp comprising
- a light source provided with a discharge vessel that is closed in a gastight manner and transmissive for visible radiation,
- a housing connected to the light source and provided with a lamp cap,
- ballast means electrically connected to the light source for operating the light source and positioned at least partly in a space surrounded by the housing, characterized in that the ballast means comprises a circuit arrangement as claimed in claim 1.

* * * * *